United States Patent
Iliuta

(10) Patent No.: US 9,428,027 B2
(45) Date of Patent: Aug. 30, 2016

(54) ASSEMBLY TO ADJUST THE HEIGHT OF AN AXLE OF A VEHICLE

(71) Applicant: Advanced Suspension Systems Pty Ltd, Queensland (AU)

(72) Inventor: Radu Iliuta, Queensland (AU)

(73) Assignee: Advanced Suspension Systems Pty Ltd.

( * ) Notice: Subject to any disclaimer, the term of this patent is extended or adjusted under 35 U.S.C. 154(b) by 26 days.

(21) Appl. No.: 14/377,280

(22) PCT Filed: Dec. 13, 2012

(86) PCT No.: PCT/AU2012/001522
§ 371 (c)(1),
(2) Date: Aug. 7, 2014

(87) PCT Pub. No.: WO2013/086567
PCT Pub. Date: Jun. 20, 2013

(65) Prior Publication Data
US 2015/0298519 A1  Oct. 22, 2015

(30) Foreign Application Priority Data

Dec. 13, 2011  (AU) ................................ 2011905196

(51) Int. Cl.
*B60G 17/005*  (2006.01)
*B60G 17/017*  (2006.01)
*B60G 3/02*  (2006.01)
*B60P 1/02*  (2006.01)

(52) U.S. Cl.
CPC ............... *B60G 17/017* (2013.01); *B60G 3/02* (2013.01); *B60G 17/005* (2013.01); *B60P 1/027* (2013.01); *B60G 2300/04* (2013.01); *B60G 2300/38* (2013.01); *B60G 2800/203* (2013.01)

(58) Field of Classification Search
CPC .............. B60G 17/005; B60G 17/017; B60G 2300/04; B60G 11/183; B60G 2200/22; B60G 2202/134; B60G 2800/203; B60G 2800/204; B60G 3/02; B60G 2300/38; B60P 1/027
See application file for complete search history.

(56) References Cited

U.S. PATENT DOCUMENTS

| | | | | |
|---|---|---|---|---|
| 2,179,477 A * | 11/1939 | Berendsen | ............ | B60G 21/05 267/246 |
| 2,227,762 A * | 1/1941 | Ronning | ............ | B60G 11/183 267/275 |
| 2,806,710 A * | 9/1957 | Mascaro | ................ | B60D 1/465 172/328 |
| 2,807,381 A * | 9/1957 | Tegeler | ................. | B60P 3/1033 280/43.11 |
| 2,882,064 A * | 4/1959 | Morrison | ............. | B60P 3/1033 280/414.1 |
| 3,434,732 A | 3/1969 | Heldenbrand | | |
| 3,832,932 A * | 9/1974 | Even | .................... | B62D 63/062 280/43.23 |
| 4,008,902 A * | 2/1977 | Dill | ........................ | B60P 1/025 280/43.23 |
| 5,161,814 A | 11/1992 | Walker | | |
| 5,411,287 A * | 5/1995 | Henschen | ............ | B60G 11/183 267/276 |

(Continued)

*Primary Examiner* — Laura Freedman
(74) *Attorney, Agent, or Firm* — Skinner and Associates; Joel D. Skinner

(57) ABSTRACT

An assembly for adjusting the distance between a wheel axle of a vehicle and a surface of a road. The assembly comprises: an axle casing connected substantially parallel to at least one wheel axle and rotatably connected proximal to an underside of the vehicle. The assembly also includes at least one actuator arm fixed to and extending from the axle casing. The assembly further having at least one retraction mechanism connected in a fixed position in relation to the vehicle. The mechanism has at least one retractable linkage connected to the at least one actuator arm, which is adapted to be adjusted in length to rotate the actuator arm with respect to the vehicle.

14 Claims, 22 Drawing Sheets

(56) References Cited

U.S. PATENT DOCUMENTS

| | | | |
|---|---|---|---|
| 6,592,139 B1 * | 7/2003 | Shanahan | B60P 1/027 280/414.5 |
| 6,692,014 B1 * | 2/2004 | Grosso | B60G 7/02 280/124.166 |
| 6,945,743 B2 * | 9/2005 | Sherman | A01K 97/01 414/476 |
| 7,243,979 B1 * | 7/2007 | Stene | B60P 1/027 296/163 |
| 7,618,227 B2 * | 11/2009 | Smith | B60P 1/027 280/414.5 |
| 2004/0004333 A1 * | 1/2004 | Riermann | B60G 3/14 280/43.17 |
| 2005/0184485 A1 * | 8/2005 | Timmermans | B62D 63/061 280/656 |
| 2006/0186616 A1 * | 8/2006 | Rudiger | B60G 3/14 280/6.15 |

* cited by examiner

ASSEMBLY TO ADJUST THE HEIGHT OF AN AXLE OF A VEHICLE

TECHNICAL FIELD

The present invention relates to wheeled transport devices and trailers that are towed behind a vehicle having a cargo bay to transport a load and in particular, transport devices or and trailers having a cargo bay that can be lowered towards the surface of the road to assist loading of the cargo bay.

BACKGROUND TO THE INVENTION

Mechanisms that enable the lowering and elevation of vehicle axles and in particular, the axle of a trailer, in order to adjust the height of an associated cargo bay from ground level, are well known. It is often a necessity that when loading large or heavy objects onto a trailer that the loading deck of the trailer is lowered to be close to the surface of the road to assist loading.

Typically the lowering and elevation of a trailer is achieved through the use of either hydraulic or electrical motor driven systems and also through manually operated mechanisms. Whilst the use of all of the above may achieve the desired result, hydraulic systems in particular are expensive and when used in relation to relatively low weight loads such as motor cycles, lawnmowers and the like, being over specified and unnecessary. As such, it would be useful in many scenarios to provide an assembly specified appropriately for loading such low weight items, for an affordable price. In particular, it would be advantageous to provide such an assembly that incorporates at least some conventional, readily available parts, such as conventional torsion bar suspension arrangements and conventional swing arms, in order to reduce the need for producing bespoke and potentially expensive parts.

A range of electrically and manually operated solutions to adjust the height of vehicle and in particular, trailer axles, are currently in existence. For example, U.S. Pat. No. 6,592,139 discloses a linkage mechanism to pivot the wheels of a trailer around a raised axis in order to adjust the axle height of the trailer. However, the multiple linkage points and lack of mechanical advantage provided when operating the mechanism are likely to generate large friction forces, which would prove difficult to operate and increase the likelihood of mechanical failure. Furthermore, due to the multiple linkage design, the disclosed invention poses a further drawback by requiring a considerable amount of space under the trailer and would prove cumbersome to retro fit to an existing trailer. Accordingly, it would be beneficial in many instances to provide a reliable, compact and simple solution that can be produced as a discrete assembly, adapted to be fitted to existing conventional trailers.

An alternative solution that attempts to resolve some of these problems is disclosed in U.S. Pat. No. 2,807,381 in which a mechanism that uses a cable and winch arrangement to alter the position of the wheels and accordingly alter the height of the trailer is shown. However there are also a number of drawbacks inherent in this solution, for example, the single winch arrangement dictates that the axle height of each wheel of the trailer are adjusted simultaneously and accordingly, can not be adjusted independently. Also the cables are likely to stretch during use or break.

Accordingly, it would be useful to provide a solution that avoids or substantially alleviates any of the disadvantages present in the prior art, or which provides a useful alternative to the prior art approaches.

SUMMARY OF THE INVENTION

According to a preferred embodiment of the invention, there is provided an assembly for adjusting the distance between a wheel axle of a vehicle and a surface of a road, the assembly comprising an axle casing connected substantially parallel to at least one wheel axle and rotatably connected proximal to an underside of the vehicle, at least one actuator arm fixed to and extending from the axle casing and at least one retraction mechanism connected in a fixed position in relation to the vehicle, the mechanism having at least one retractable linkage connected to the at least one actuator arm and adapted to be adjusted in length to rotate the actuator arm with respect to the vehicle. In such an embodiment, it is preferable that the axle casing has one or more casing brackets connected along its length, each casing bracket adapted to rotatably connect the axle casing to the underside of a vehicle around a pivot point. Furthermore, the assembly preferably includes a locking mechanism connected in a fixed position in relation to the vehicle, having a pin configured to deploy from a retracted position to slidably engage with at least one aperture arranged through an actuator arm, fixing the actuator arm in a locked position.

According to one aspect of the invention, an actuator arm, a retraction mechanism and a retractable linkage are positioned adjacent to each wheel axle. In this arrangement, each retraction mechanism is arranged substantially below an associated second end of an actuator arm.

In an alternative embodiment of the invention the axle casing is connected to each wheel axle by a swing arm, each swing arm having a shaft arranged substantially perpendicular thereto and rotatably connected to a longitudinal axis of the axle casing and a wheel axle arranged substantially perpendicular thereto and adapted to connect to a wheel. IN such a configuration, the axle casing houses a torsion bar suspension assembly.

According to another aspect of the invention, the axle casing is connected between a pair of wheel axles.

In one preferred embodiment, each retraction mechanism includes a drum connected to the retractable linkage. Preferably each drum is rotated by at least one drive means and the drive means is selected from one or more of: an electric motor, a hydraulic motor, an internal combustion engine, a manually rotated ratchet mechanism or a worm drive.

Alternatively, in another preferred embodiment, the assembly has a single drive means, being a drive shaft connected to a pair of retraction mechanisms and configured to rotate the drum of each mechanism simultaneously.

According to another preferred embodiment of the invention, the retractable linkage is selected from one or more of: a belt, a chain, a cable or a hydraulic piston.

In yet another preferred embodiment of the invention, at least one casing bracket is rotatably connected to a frame bracket, the frame bracket adapted to be connected to the vehicle. Furthermore, it is preferable that the at least one retraction mechanism and locking mechanism are fixed to the frame bracket. Alternatively, the at least one casing bracket is rotatably connected to a first frame bracket and the at least one retraction mechanism and locking mechanism are connected to a second frame bracket.

In one preferred embodiment, the locking mechanism is remotely activated by one or more of the following: an electric solenoid, a cable, a pneumatic piston or a hydraulic ram.

In an alternative preferred embodiment, the pivot point is arranged between a longitudinal axis of the axle casing and a wheel axle. Conversely, in an alternative preferred embodiment, a longitudinal axis of the axle casing is arranged between the pivot point and a wheel axle.

It is preferable that each actuator arm is fixed arranged substantially perpendicular to the axle casing.

Furthermore, it is preferable that the vehicle is selected from: a trailer, including a boat trailer, motorcycle trailer, animal trailer such as a horse box or a caravan.

BRIEF DESCRIPTION OF THE DRAWINGS

Preferred embodiments of the invention will now be described by way of example only, with reference to the accompanying drawings in which.

DETAILED DESCRIPTION OF PREFERRED EMBODIMENTS

Figure 1:
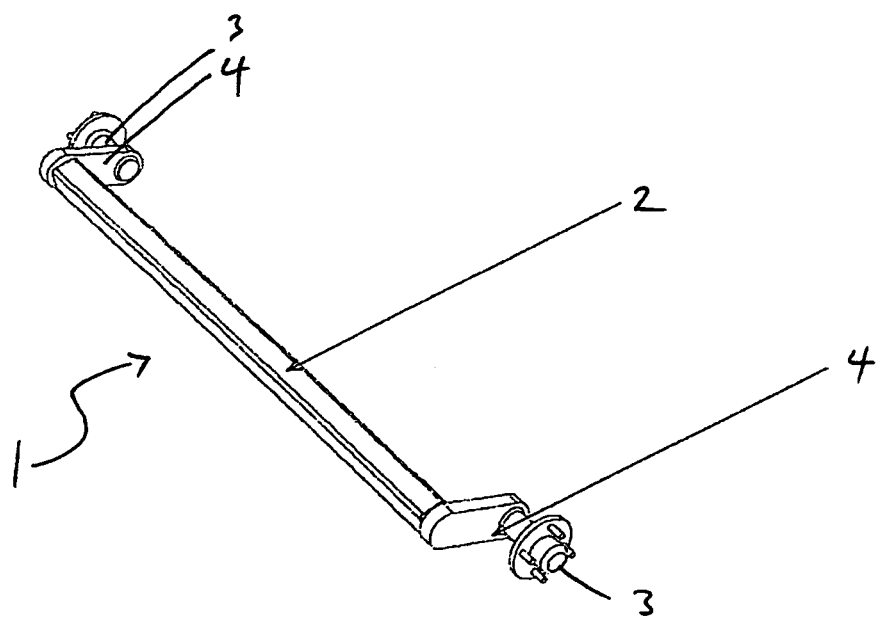
FIG. 1 is prior art, illustrating a perspective view of a conventional rubber torsion bar suspension axle assembly.

The present invention relates to an assembly used to adjust the axle height of a wheeled vehicle and in particular, to adjust the axle height of a trailer. The assembly assists access to the loading deck of the vehicle by lowering the deck towards the surface of the road by adjusting the distance between the surface of the road and the wheel axle. This may be necessary due to the load being of a substantial weight or size which would prove difficult to manually lift onto the loading deck, or that the load may be more conveniently loaded by rolling onto the loading deck directly from the road surface.

The preferred embodiment of the assembly of the present invention may be integral with or retro fitted to a conventional lightweight trailer, which are typically towed behind a domestic automobile or van and used to transport items such as motor cycles, bicycles, lawn mowers, small boats, animals and the like. Whilst the preferred embodiment is focused on trailers, it is also within the scope of the invention that the assembly may also be integral or retro fitted to front wheel drive vehicles, caravans, motor homes and other towed items.

The elevation and lowering of a loading deck or cargo bay of a trailer by the assembly of the present invention is driven either by powered or manual means and is achieved by rotating at least one axle height adjusting assembly around a pivot point connecting each assembly to a trailer, preferably being the underside of the trailer. By doing so, the distance of the wheel axle from ground level, typically being a surface of a road, is adjusted and consequently, the loading deck is either lowered or elevated in relation to the road surface. It is preferable that the invention provides the option of lowering the axles of the vehicle either simultaneously or independently, enabling a user to tilt the loading deck towards one side of the trailer or another when loading if necessary.

An alternative preferred embodiment is directed towards providing a stand-alone kit, including at least two height adjustment assemblies attached to a sub-frame, the sub-frame adapted to be retro-fitted to a conventional trailer or towed item.

A further alternative preferred embodiment of the invention is adapted to connect to a conventional torsion bar suspension axle assembly having an axle casing rotatably connected to a pair of swing arms at either side of the casing, each swing arm having an axle adapted to connect to a conventional vehicle wheel, the axle casing housing a plurality of resilient torsion bars which allow each swing arm to be rotatably displaced, before being forced by the torsion bars to their original orientation. Such an arrangement provides an adequate level of wheel displacement dampening when a trailer is in transit and provides a cost effective solution by utilising readily available parts. It is preferable that the torsion bar within such an embodiment is made from an elastomer however, steel, coil springs or other suitable dampening torsion bar materials are within the scope of the invention. However, it is also within the scope of the invention that other suspension means such as conventional leaf spring or coil spring arrangements may be used in place of a torsion bar suspension assembly.

In such an embodiment of the invention, it is preferable that the attachment means between the assembly and a trailer or vehicle is provided by a bracket, configured to rotatably connect an axle casing of the torsion bar suspension assembly, around which the swing arms rotate, from a pivot point between the assembly and trailer. Such an arrangement provides the advantage that when used with conventional, short length swing arm units, the alternative axis of rotation between the assembly and trailer provides an increased radius of rotation and consequently, an increased length of travel of the trailer wheel axle. It is preferable that the bracket is attached to the exterior of the torsion bar suspension axle casing, enabling the entire suspension arrangement and axle height adjusting sub-assemblies to rotate around the bracket pivot point. Such an arrangement provides an economic alternative to other known systems wherein a torsion bar suspension arrangement is rotated around its own longitudinal axis, typically requiring complex and expensive bushes and bearings and increasing the chances of mechanical failure.

Referring to the drawings, FIG. 1 shows a conventional rubber torsion bar suspension axle arrangement (1), having an axle casing (2) extending between a pair of swing arms (4), each swing arm connected at a first end to a longitudinal axis arranged through the centre of the axle casing and positioned at an angle to the axle casing, and connected at a second end to an axle (3), adapted to connect to a conventional vehicle wheel. Each swing arm has an axle (not shown) arranged perpendicular to its first end that extends partially along the longitudinal axis the axle casing and which is surrounded at regular intervals by a plurality of torsion bars, arranged substantially parallel to the axle typically being in each corner of the axle casing, the torsion bars providing a resilient element that allows the swing arm to rotate in relation to the axle casing, due to forces applied to a wheel connected at the second end of the swing arm, and subsequently forcing the swing arm to return to its original orientation.

Figure 2:
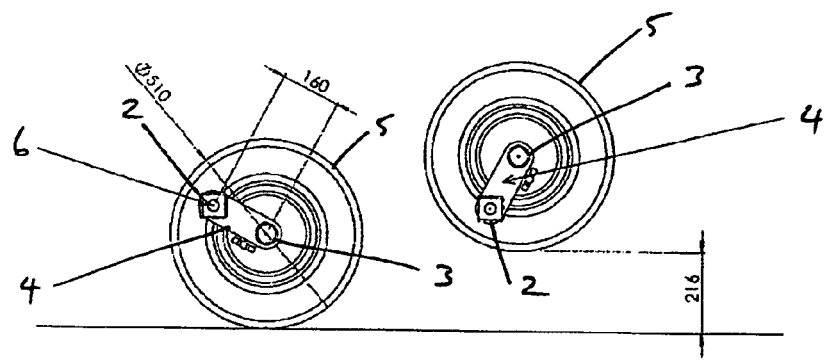
FIG. 2 is prior art, illustrating a side view of the assembly shown in the previous figure rotated around an axle casing of the torsion bar suspension assembly to elevate the wheels from ground level.

FIG. 2 shows a prior art approach to adjusting the axle height of a torsion bar suspension arrangement, showing two side views of the assembly shown in FIG. 1, attached to a wheel (5). The assembly is shown in a first position on the left, having the wheel in contact with a surface, such as a road, and a second position on the right, where the entire assembly is rotated counter-clockwise around the longitudinal axis (6) of the axle casing (2) by 90 degrees, lifting the wheel upwards and away from the surface. It can be seen from FIG. 2 that the lift of the wheel axle (3) attainable in this arrangement is limited by the length of the swing arm (4) which dictates the distance between the pivot point, in this case being the longitudinal axis of the axle casing, and the wheel axle, being the radius that the wheel axle is able to be rotated by.

Figure 3:
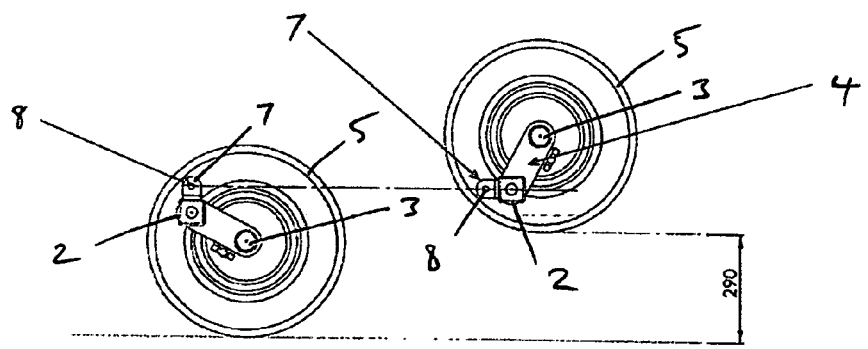
FIG. 3 is a side view of a preferred embodiment of the invention, showing an assembly having a casing bracket fixed to the axle casing.

In FIG. 3 a preferred embodiment of the assembly of the present invention is shown, having a casing bracket (7) fixed to a side of an axle casing (2), providing an alternative attachment point between the assembly and a vehicle, or a trailer, and an alternative pivot point (8) which the assembly is rotatable around with respect to the vehicle. As shown in FIG. 3, as the casing bracket (7) offsets the pivot point (8) of the assembly from the longitudinal axis of the axle casing (2), the distance between the pivot point and the wheel axle (3) is increased and consequently the lift of the wheel axle that is attainable is also increased.

Figure 4:
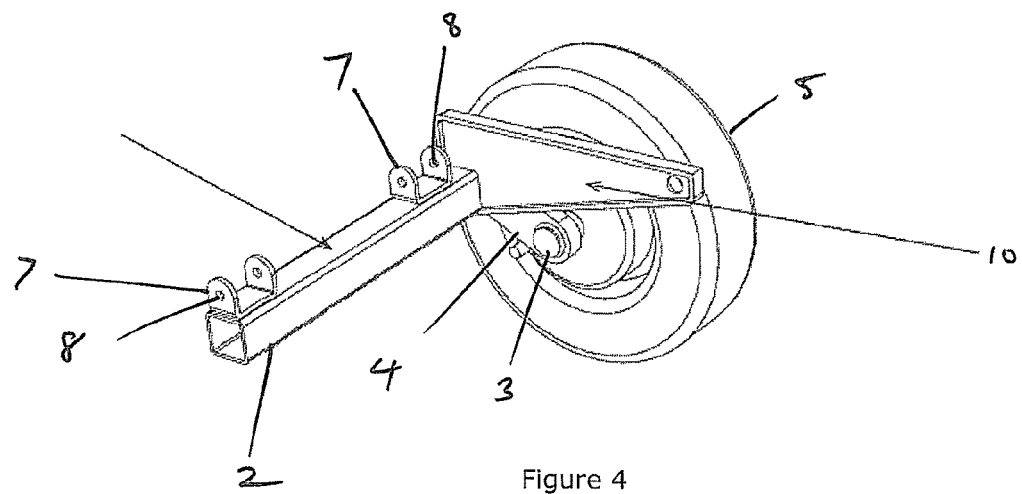
FIG. 4 is a perspective view of a first preferred embodiment of the invention having an actuator arm fixed to an axle casing.

In FIG. 4 a further preferred embodiment of the assembly of the invention is shown, incorporating the embodiment shown in FIG. 3 which includes a conventional torsion bar suspension arrangement, a wheel (5) and at least one casing bracket (7) adapted to rotatably connect the assembly to a vehicle around a pivot point (8), to allow the position of the wheel axle (3), and an associated wheel, to be adjusted in relation to a road surface, which in turn, adjusts the height of a loading deck of the vehicle. The assembly includes an actuating member (10), preferably being an arm, connected at a first end to an axle casing (2) and having a substantially greater length than a conventional torsion bar suspension swing arm (4), the arm adapted to be connected at a second end, distal to the first end, to a mechanism to rotate the arm and the associated assembly in relation to a vehicle and provide a mechanical advantage, being an increase in torque, due to the distance between the connection point of the mechanism and the pivot point.

Figure 5:
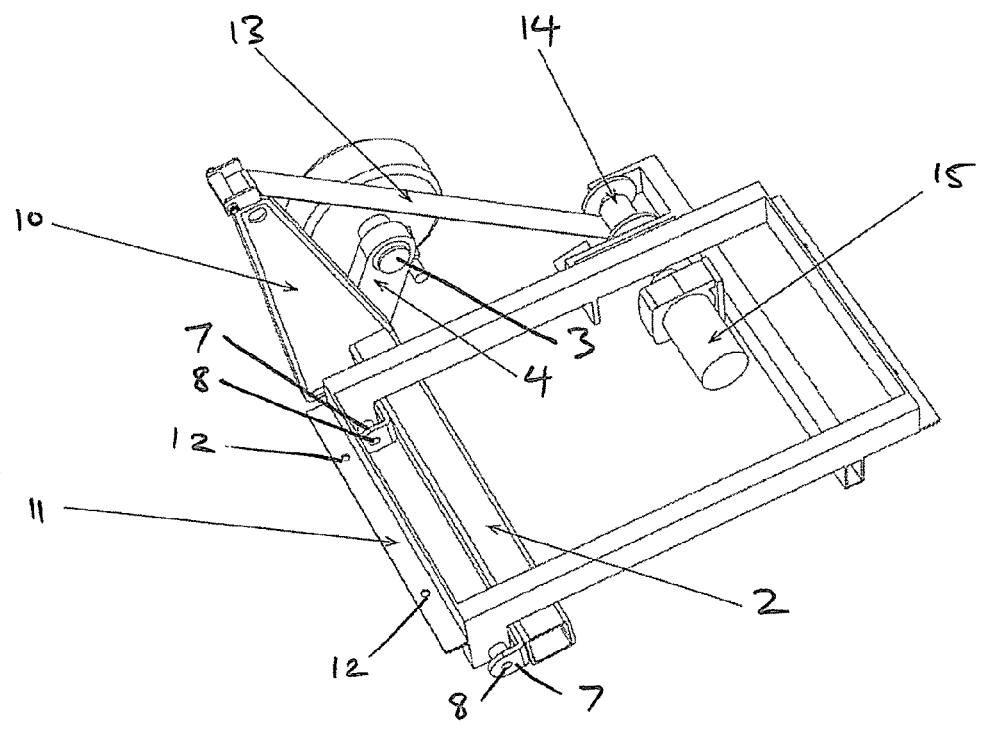
FIG. 5 is perspective view of the embodiment shown in the previous figure attached to a sub-frame.

A further preferred embodiment of the invention is shown in FIG. 5 wherein the assembly is fixed to a conventional torsion bar suspension arrangement, an axle casing (2) of the arrangement being connected by one or more casing brackets (7) to the underside of a vehicle or trailer, or in this case to a sub-frame (11), to provide a pivot point (8) which the axle casing (2) and assembly rotates around in relation to the sub-frame.

The sub-frame (11) is adapted at points (12) to be attached to the underside of a vehicle or trailer, however it is also within the scope of the invention that the construction of the framework is adapted to be integral to the structure of the vehicle or trailer. The actuator arm (10) is shown connected at its second end to a retractable linkage (13), preferably being a belt, connected between the arm and a retraction mechanism which includes a drum (14) and a drive means (15), in this case being an electric motor. The belt may be retracted around the drum (14) by the drive means (15) in order to rotate the assembly in relation to the sub-frame around the pivot point (8). Whilst it is preferable that the retractable linkage (13) is a belt, it is also within the scope of the invention that such means may include other conventional retractable elements, such as a hydraulic ram, a chain, a cable, a screw thread, a worm drive and the like.

Figure 6:
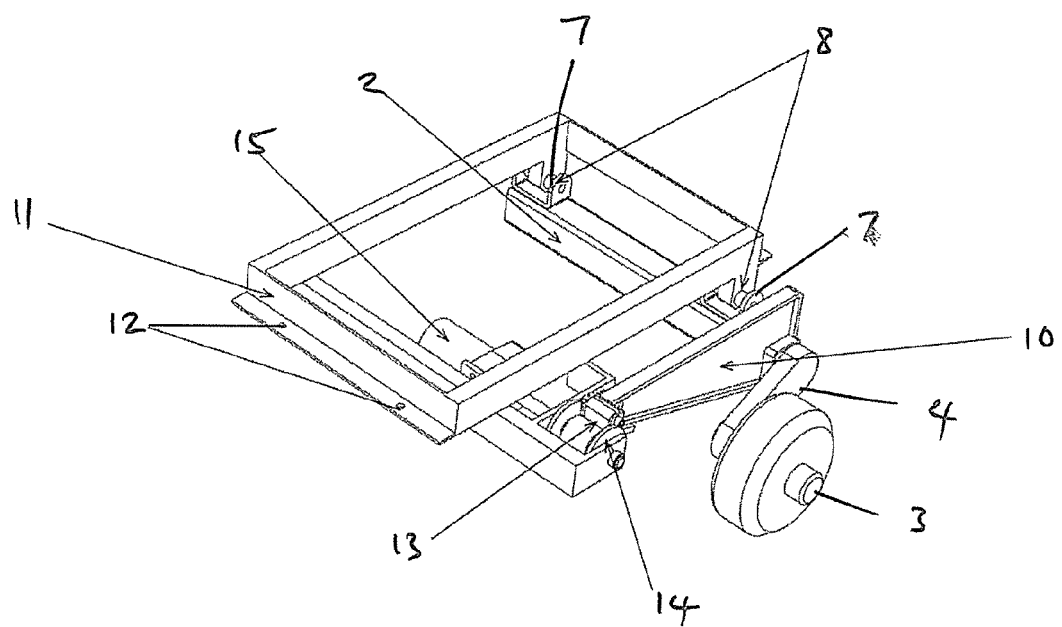
FIG. 6 is an alternative perspective view of the embodiment shown in the previous figure having an actuator arm and associated axle casing, swing arm and wheel axle rotated to a first preferred position.

FIG. 6 is a second view of the embodiment shown in FIG. 5 where the belt (13) has been wound by the motor (15) around the drum (14), rotating the actuator arm (10) to preferred first position to arrange an associated wheel axle (3) at a minimum preferred height from ground level and accordingly, the loading deck of the vehicle at a maximum preferred height from ground level at or near a road surface or the like.

Figure 7:
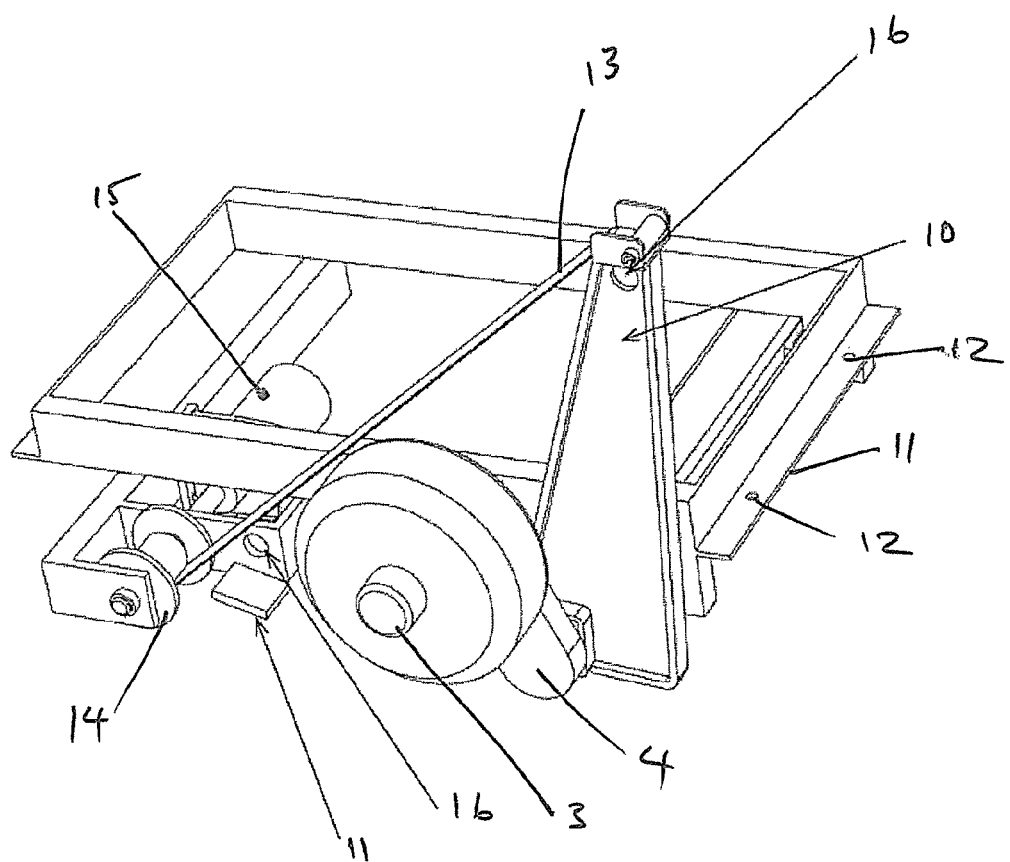
FIG. 7 is further alternative perspective view of the embodiment shown in the previous two figures having the actuator arm and associated components rotated to a second preferred position.

FIG. 7 is a third view of the embodiment shown in FIG. 3, in which the motor (15) has released the belt (13) from the drum (14) and accordingly, due to the weight of a vehicle or trailer connected to the sub-frame (11), the wheel axle (3) is forced upward, away from ground level to a preferred second position, arranging the wheel axle at a maximum preferred height from ground level and an associated loading deck at a minimum preferred height from ground level at or near a road surface or the like.

In FIG. 7, features of a locking mechanism are also shown, the mechanism preferably including at least one aperture (16) through the actuator arm (10), at least one corresponding aperture (16) through the vehicle body, or in this through the case sub-frame (11), and a locking shaft (not shown), configured to be extended from a retracted, unlocked position, allowing the actuator arm to rotate freely in relation to the sub-frame, to a deployed, locked position, sliding through the pair of apertures (16) when the actuator arm rotates to that the apertures are aligned and securing the actuator arm in a first preferred position. Preferably, this position is at the minimum wheel axle height and securely fixes the sub-assembly at the maximum loading deck height, reducing forces transmitted through the retraction mechanism and increasing the structural integrity of the assembly when transporting heavy loads. Whilst it is preferable this position is at one extent of the required assembly rotation, it is also within the scope of the invention that there are a plurality of apertures arranged through the actuator arm along the arc of rotation, allowing the actuator arm to be secured to a vehicle or sub-frame at multiple positions, which provide different increments of axle height adjustment as required.

Figure 8:
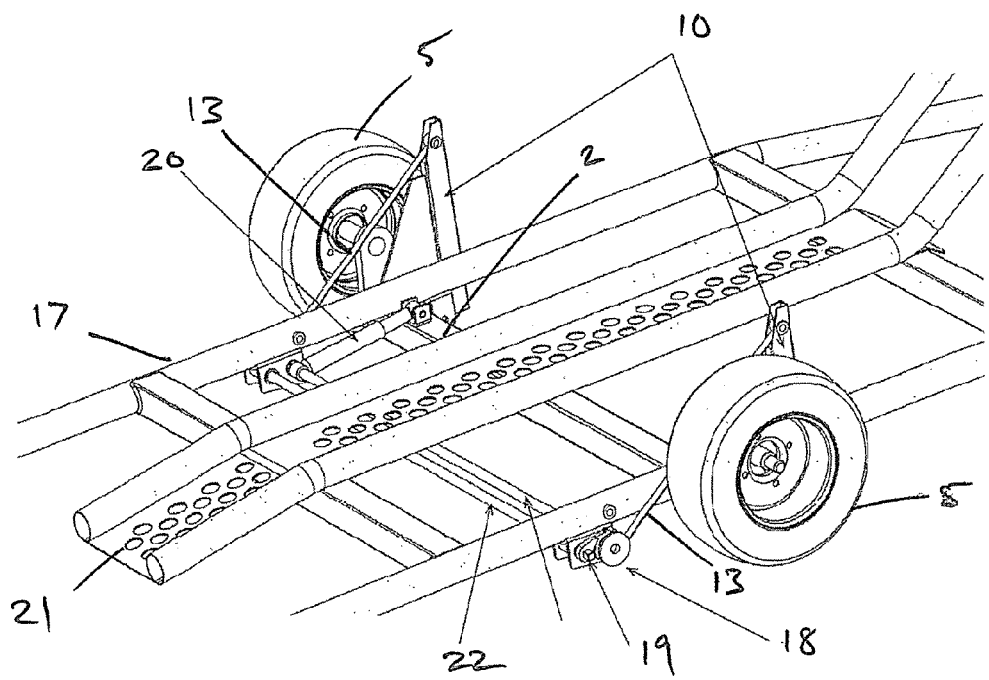
FIG. 8 is a perspective view of an alternative preferred embodiment of the invention secured to a trailer.

FIG. 8 illustrates an alternative preferred embodiment of the invention having two height adjusting assemblies attached to a trailer (17), each assembly having a retraction mechanism that includes a ratchet (18) and a port for a handle (19) to allow manual adjustment of the rotational position of each assembly. Preferably the embodiment also includes at least one hydraulic piston (20), attached between the trailer and the axle casing (2) to dampen the rotational motion of the assemblies when reducing the height of the loading deck (21). In the preferred embodiment, a drive shaft (22) is connected between the ratchet mechanism of a pair of assemblies to enable parallel lowering and elevation of wheel axles using a single handle.

Figure 9:
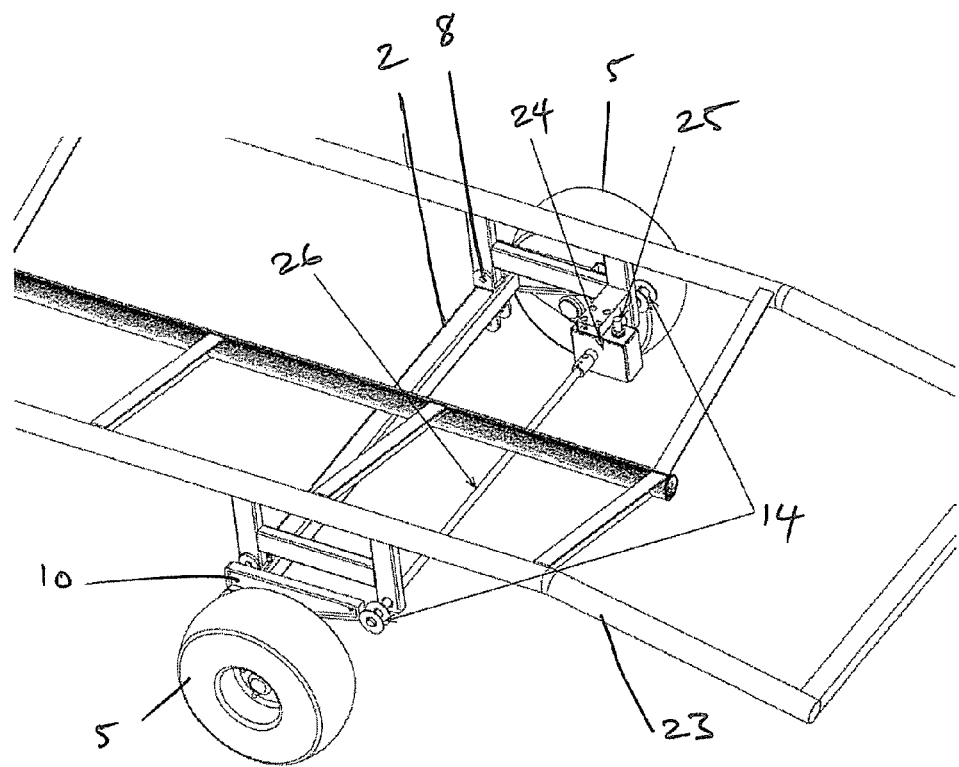
FIG. 9 is a perspective view of a further alternative preferred embodiment of the invention secured to an alternative trailer.

FIG. 9 illustrates a further alternative preferred embodiment of the invention, having two height adjusting assemblies attached to an alternative trailer (23). At least one assembly having a retraction mechanism that includes a gearbox (24), preferably having a worm gear, and a port (25) to attach a power tool, such as an electric drill, in order to provide the drive means and rotate the assemblies. The retraction mechanisms are also connected by drive shaft (26) to provide a parallel motion between both mechanisms when lowering and elevating the wheel axles.

Figure 10:
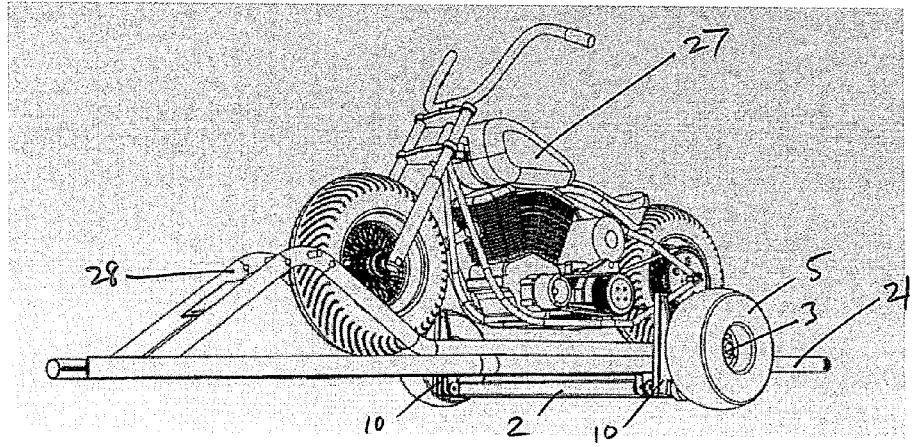
FIGS. 10 and 11 show perspective view of the embodiment of the invention shown in FIG. 8 having the assembly of the present invention rotated from a first preferred position to a second preferred position.

FIG. 10 is a second view of the embodiment shown in FIG. 8, where both height adjusting assemblies have been rotated to a first preferred position providing maximum distance between each wheel axle (3) and the surface of a road and lowering a loading deck (21) towards the road. A load, in this case a motor cycle (27), has been rolled up a ramp and secured to the loading deck. Preferably, the trailer also includes wheel retention means (28), configured to trap the front wheel of the motor cycle (27) and secure the vehicle when in transit.

Figure 11:
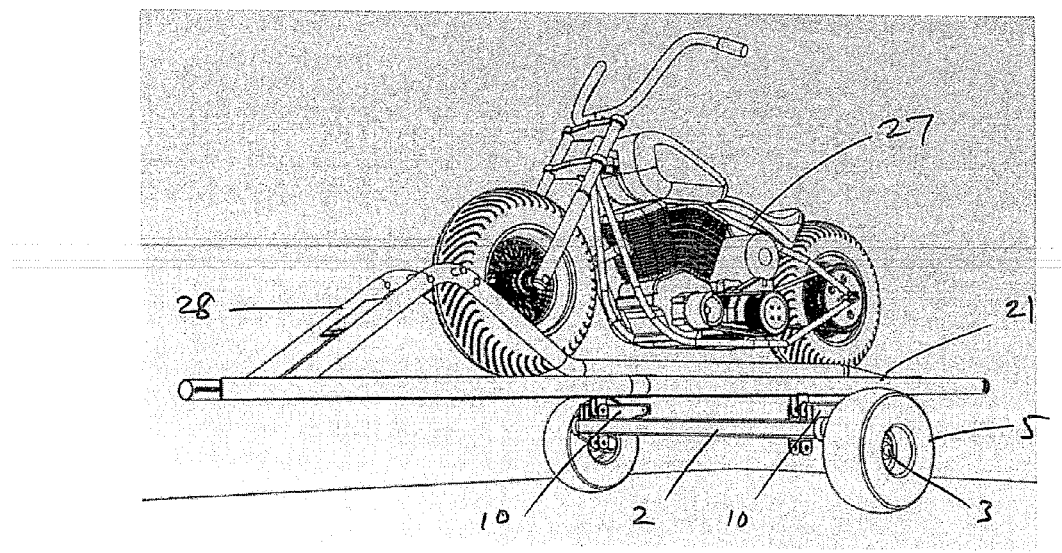

FIG. 11 is a third view of the embodiment shown in FIG. 8 where both height adjusting assemblies have been rotated to a second preferred position, reducing the distance between the wheel axle (3) and the surface of a road to a preferred minimum. This increases the loading deck (21) height to a preferred maximum distance for the trailer to be towed behind a vehicle and transport the load.

Figure 12:
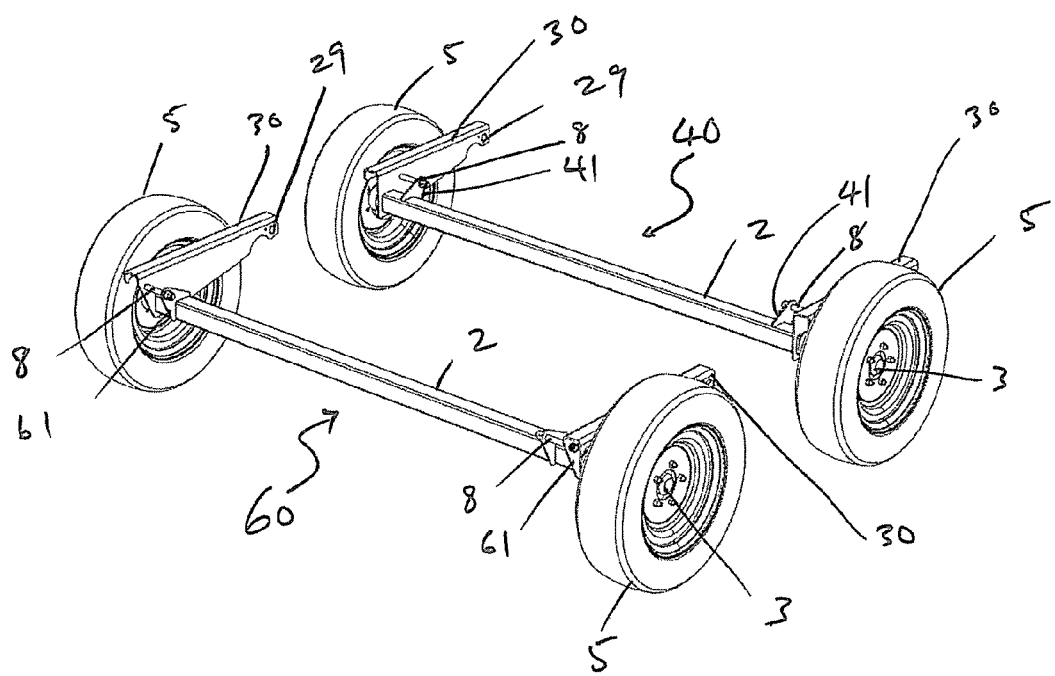
FIG. 12 is a perspective view of two alternative preferred embodiments of the invention.

In FIG. 12, two further preferred alternative embodiments of the invention are shown, a first configuration (40) being an alternative version of the invention as shown in FIGS. 3-7 having an alternative casing bracket (41), providing a pivot point (8) arranged between the longitudinal axis of an axle casing (2) and a wheel axle (3) connected to a swing arm (4). The second configuration (60) having a further alternative casing bracket (61), positioning the longitudinal axis of the axle casing (2) between a pivot point (8) and a wheel axle (3). The different arrangements of the pivot point, axle casing axis and wheel axle both vary the distance between the connection point (29) between a retraction mechanism and an actuator arm (30), providing variations of mechanical advantage for the drive means of the retraction mechanism, essentially allowing a single drive unit, such as an electric motor, to apply different levels of torque to the actuator arm according to the configuration. This also varies the distance between the pivot point and the wheel axle, thereby varying the distance the wheel axle can be displaced vertically in relation to ground level.

Figure 13:
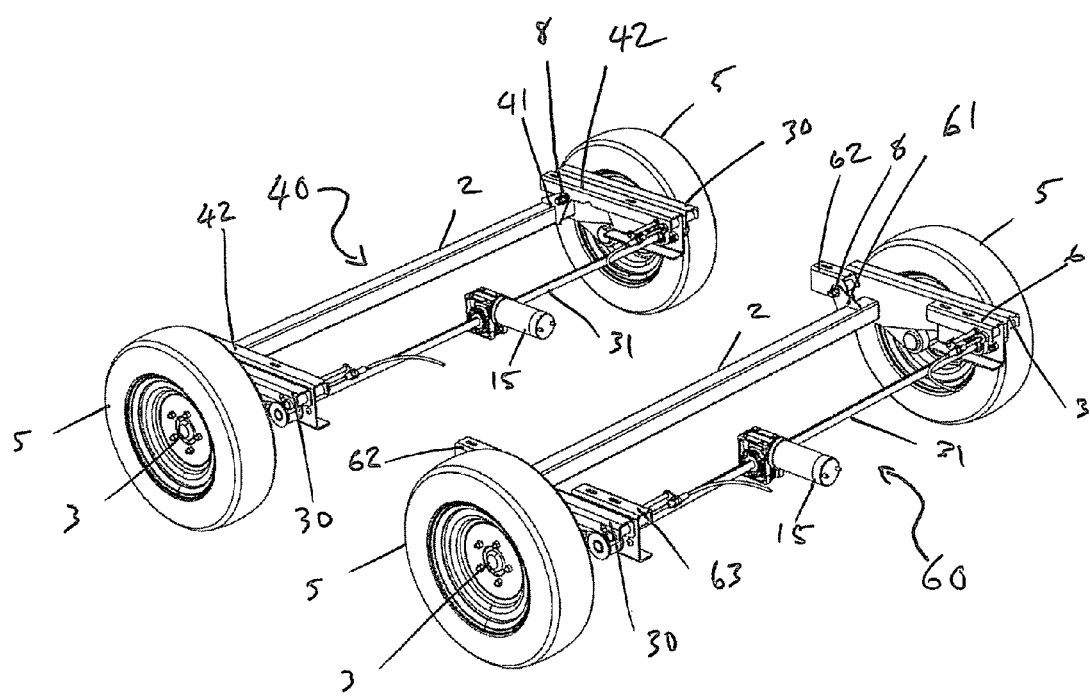
FIG. 13 is an alternative perspective view of the two embodiments shown in the previous figure, each connected to a pair of wheels and drive means.

FIG. 13 shows an alternative view of the embodiments shown in FIG. 12, where each configuration (40), (60) is shown adjacent to frame brackets (42), (62), (63). Each frame bracket is adapted to secure a height adjusting assembly to the underside of a vehicle or trailer, similar to the sub-frame (11) previously described. Both configurations are also shown connected to a single drive means, in this case being an electric motor (15), the motor in connection with a further alternative drive shaft (31), preferably being a keyed or splined shaft allowing the motor to rotate the shaft regardless of its connection position along its length, which is in turn connected to a pair of height adjusting assemblies, to deploy or retract a retractable element and allow both assemblies to rotate in relation to a vehicle or trailer in parallel.

Figure 14:
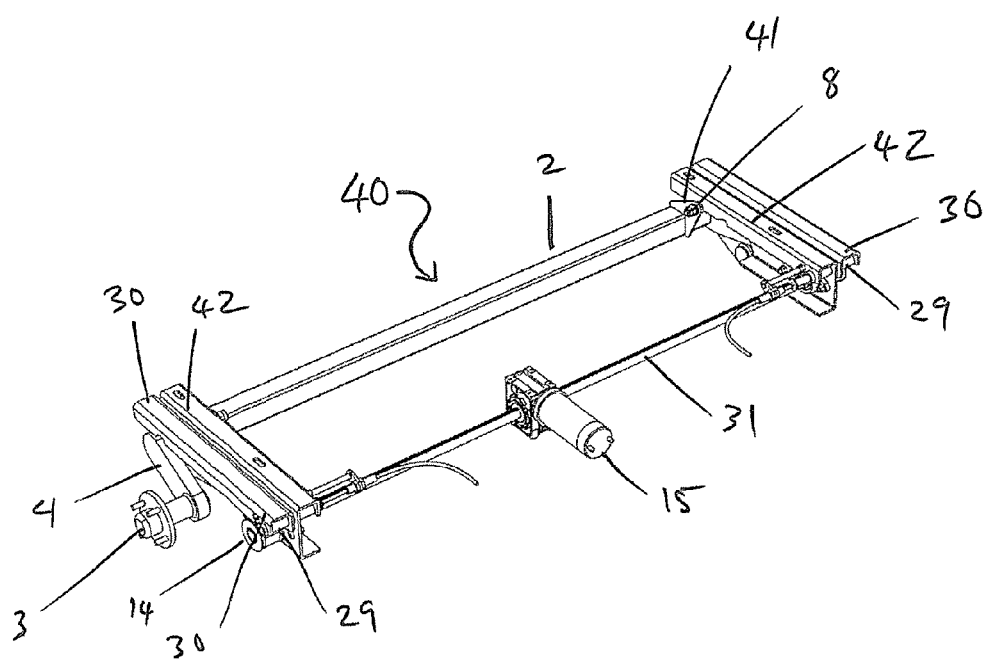
FIG. 14 is a perspective view of a first alternative preferred embodiment of the invention previously shown in FIG. 12.

In FIG. 14, a perspective view of the first configuration (40) of the invention is shown, having the same components as previously described in relation to the embodiment shown in FIGS. 2-7. A conventional torsion bar suspension axle casing (2) is connected to axle brackets (41) and proximal to a first end of an actuating arm (30). The axle casing is also connected to a pair of swing arms (4), each of which provide an axle (3) adapted to connect to a wheel and configured to partially rotate in relation to the axle casing (2) to dampen the ride of a vehicle attached to the torsion bar suspension assembly. Each axle bracket (41) rotatably connects the axle casing (2) to one of a pair of frame brackets (42) around a pivot point (8). The pair of frame brackets are preferably configured in a mirrored orientation to one another, for the left and right hand side of the assembly. Each bracket is adapted to connect to the underside of a vehicle or trailer, in this case, having a plurality of apertures arranged through a top surface to allow fixtures, such as bolts, to be connected through.

Similar to the previously described embodiments, each actuator arm (30) and associated torsion bar suspension assemblies are rotatable around the pivot point (8) between the axle casing (2) and the frame brackets (32) by releasing a retractable linkage connected between a point (29) proximal to a second end of the actuator arm and the frame brackets (42), the linkage being wound around a drum (14) and controllably released by a motor (15), connected to a drive shaft (31). It is preferable that the drive shaft is connected to and controls the rotation of a drum on both sides of the assembly simultaneously, however it is within the scope of the invention that a plurality of motors, or other similar drive means, are provided to control the rotation of the drum and actuating arm of each side of the assembly independently.

Figure 15:
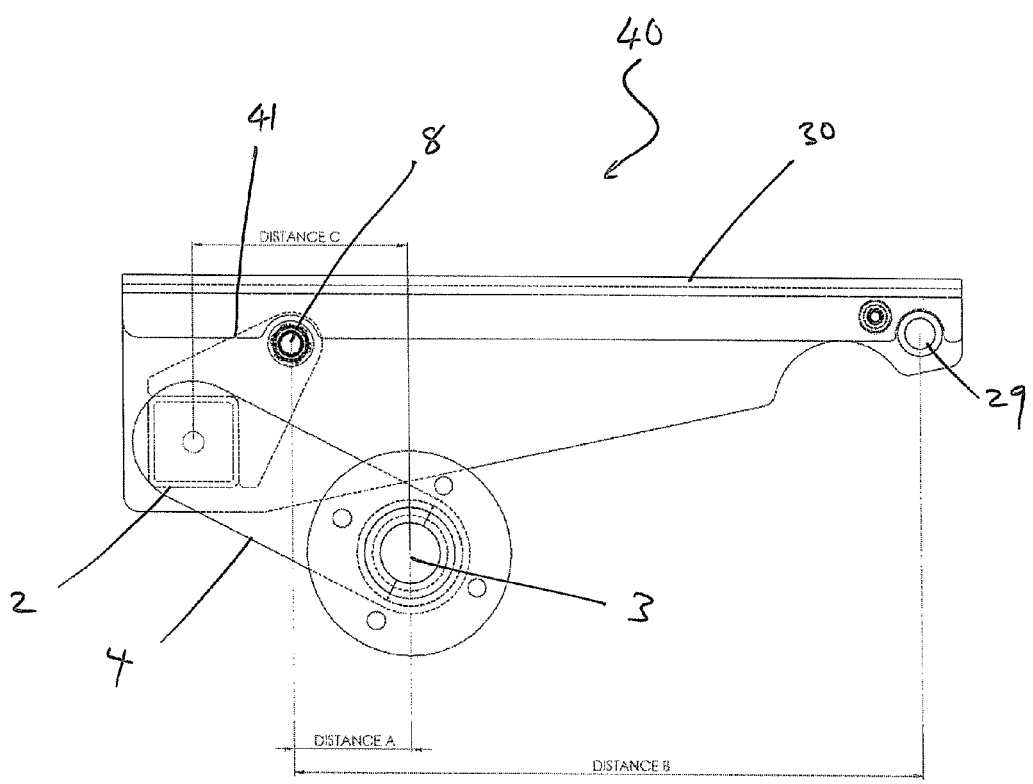
FIG. 15 is a side view of part of the embodiment shown in the previous figure.

In FIG. 15, a side view of part of the assembly shown in FIG. 14 is shown, illustrating the relationship between a longitudinal axis of an axle casing (2) (and associated swing arm (4) and wheel axle (3)), a pivot point (8) provided by a casing bracket (41) connecting the axle casing to the body or frame of a vehicle or trailer, or a frame bracket or sub-frame and a connection point (29) between a retractable linkage and an actuating arm (30).

As shown, it is preferable in such a configuration that a casing bracket offsets the pivot point to be positioned between the longitudinal axis of the axle casing and the wheel axle, providing an optimum lever length, i.e. the distance between the connection point (29) between a retraction mechanism and an actuator arm and the pivot point (8) and accordingly, an appropriate quantity of torque to be applied by a drive means, such as a motor, for most applications.

Should the torque need to be increased, for instance, if the assembly is required to lift a heavy load secured to the loading deck of a trailer, the casing bracket (41) may be adapted to provide a further alternative pivot point, positioned to increase the distance between the pivot point and the connection point between the arm and the retraction mechanism and allowing the same motor to be used.

Figure 16A:
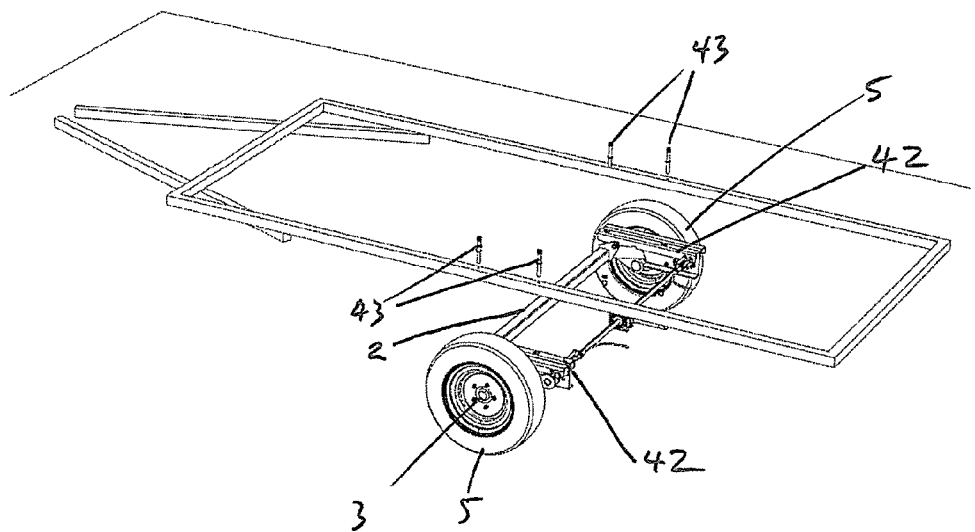
FIGS. 16A-16B are perspective views of the embodiment shown in FIG. 14, illustrated offset from the underside of a trailer and attached to the underside of the trailer.
Figure 16B:
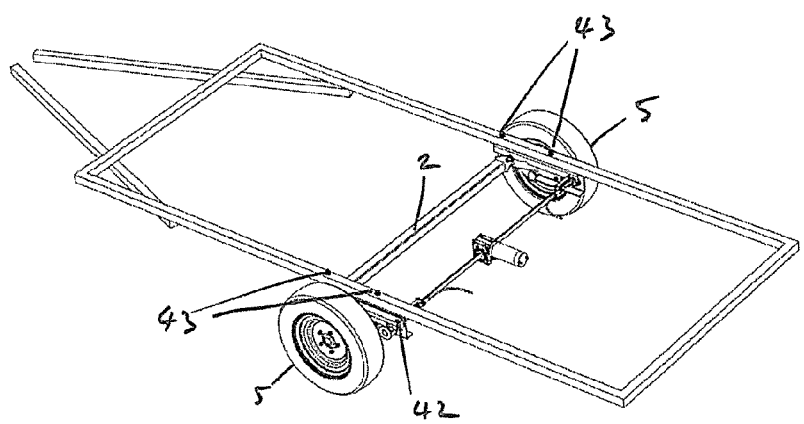

In FIGS. 16A-16B, the embodiment shown in FIG. 14 is depicted in an exploded view beneath the frame of a trailer. The assembly (40) is connected to two wheels (5), and is connected to the underside of a trailer. In the figures, a plurality of fixtures (43) can be seen positioned above, and through the trailer frame to connect into the apertures arranged through the frame brackets (42). From these figures, it will be appreciated that the assembly shown is readily retro-fitted to a range of different trailer frames, requiring only a few mechanical fixings, and little modification to be made to a trailer to provide a height adjustable trailer axle.

Figure 17A:
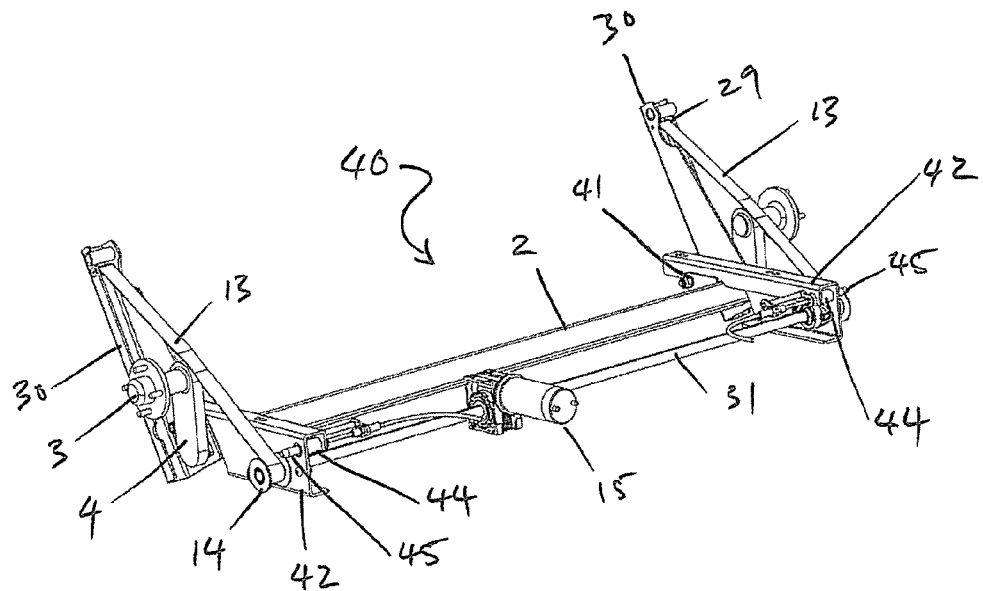
FIGS. 17A-17B are perspective views of the embodiment shown in FIG. 14, the assembly having two actuator arms and an associated axle casing, swing arms and wheel axles shown in a first preferred position and a second preferred position.
Figure 17B:
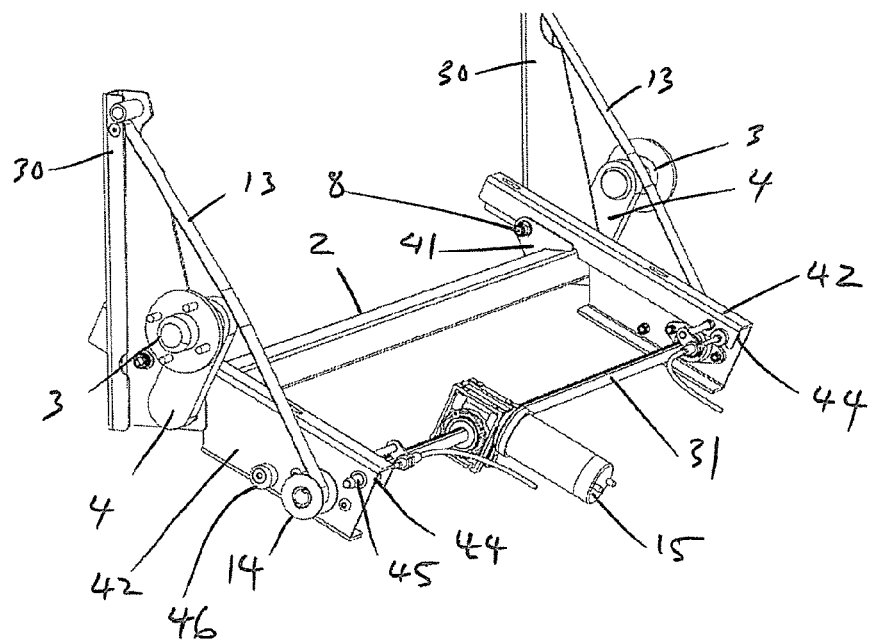

FIGS. 17A-17B show other views of the embodiment of the invention shown in FIGS. 14-16, illustrating two height adjusting assemblies having a retractable element. This is a belt (13), which is deployed by being unwound from a drum (14) by a drive means (15), in this case being a hydraulic motor or worm drive, and each actuator arm (30), and associated axle casing (2), swing arms (4) and wheel axles (3), rotated to position each wheel axle at a preferred maximum distance from ground level.

In FIG. 17B it can be seen that each frame bracket (42) is adapted to provide a fixing position for both a casing bracket (41), and associated pivot point (8), and a locking mechanism. The mechanism includes a lock body (44) rigidly fixed to a side of the frame bracket, and connected to a retractable pin (45), configured to be deployed from the body and through an aperture in the actuator arm (30) when aligned with the pin and in the preferred locking position, fixing the arm to the frame bracket. In this arrangement, the likelihood that the lock pin (45) and aperture in the actuator arm will be misaligned and unable to be connected is reduced, improving tolerances in assembly and durability of the assembly. An eccentric-centre stop (46) is also provided on the frame bracket, providing additional support for the actuator arm to rest on when the assembly is rotated and secured in its locked position and being adjustable in size due to the off centre attachment point, allowing the contact position between the stop and the actuator arm to be adjusted.

Figure 18:
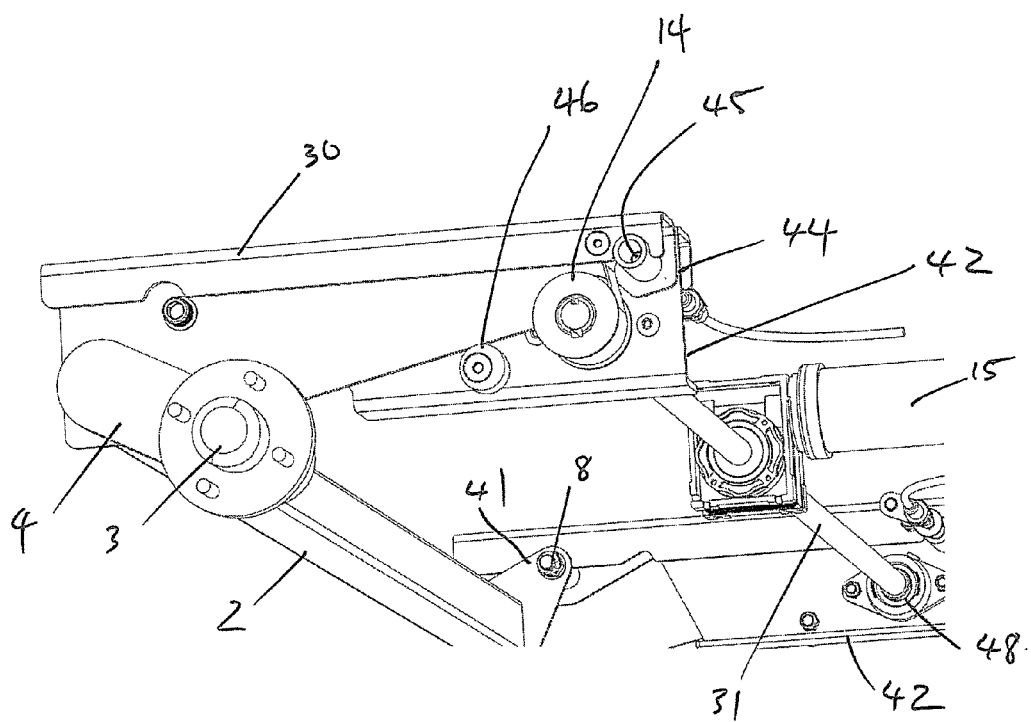
FIG. 18 is a detailed view of the embodiment shown in the previous two figures.

FIG. 18 shows an additional detailed view of the embodiment shown in FIG. 17A/17B, having both belts (13) wound around each associated drum (14) by the drive means (15), rotating each actuator arm (30) to an alternative position. This arranges each wheel axle (3) at a preferred minimum distance from ground level. In the figure, both locking mechanisms can be seen to have deployed a locking pin (45), to extend from the frame bracket (42) through an aperture arranged through each actuator arm and into a pin housing (47), preferably being a PTFE or nylon bush to reduce friction between the housing and the pin. The arm can be seen to also be resting on the stop (46), further supporting the arm in its locked position. A self-aligning bearing is also shown (48) fitted between the drive shaft (31) and the frame bracket (42) to compensate for trailer frame deformation when the frame, and attached height adjusting assemblies, are lifting heavy loads.

Figure 19A:
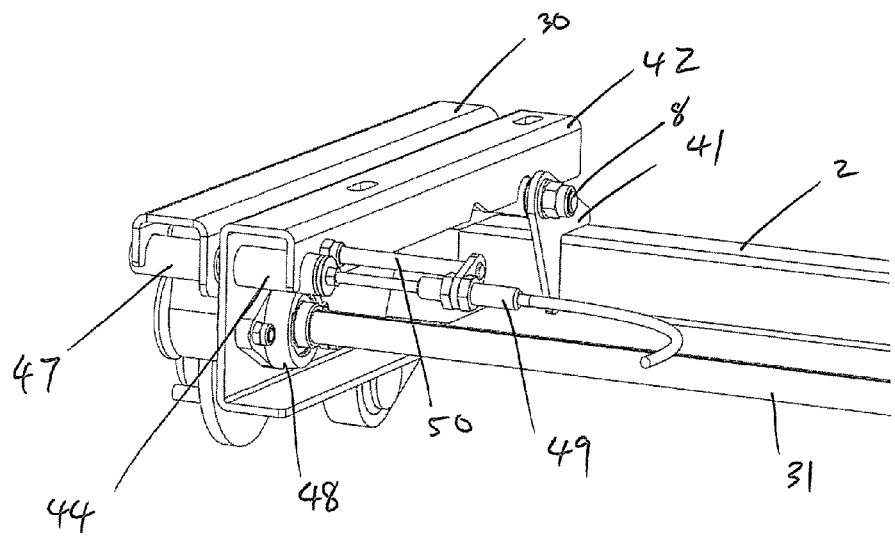
FIG. 19A-19B are further detailed and cross-section views of the embodiment shown in the previous figures, illustrating features of a locking mechanism.
Figure 19B:
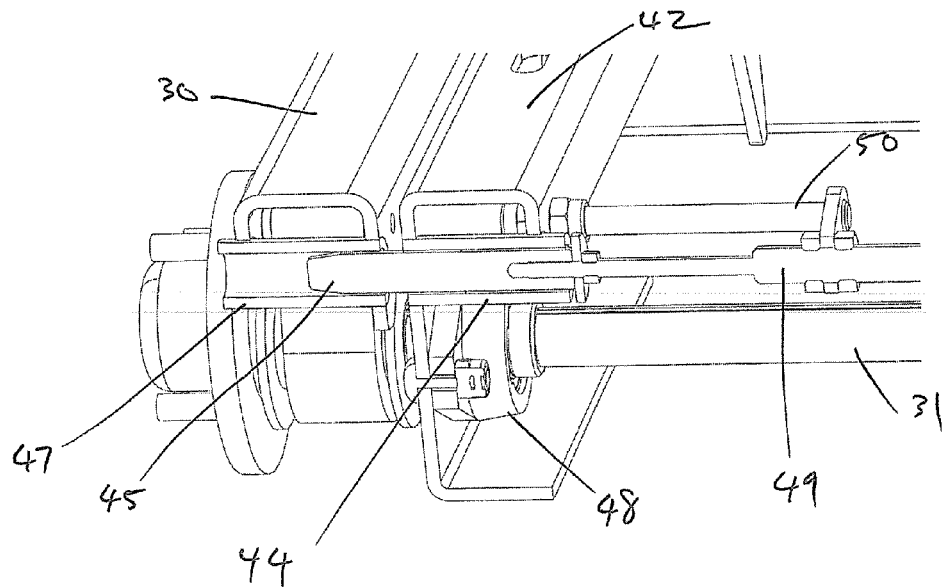

FIGS. 19A-19B show further detailed and cross-sectional views of the embodiment shown in FIG. 18, illustrating features of a lock mechanism for securing an actuator arm, and associated conventional torsion bar suspension arrangement, in a fixed position. This fixed position is preferably a minimum wheel axle distance from ground level and accordingly, a preferably maximum trailer or vehicle cargo bay distance from ground level.

Each lock mechanism includes a lock body (44), attached to a frame bracket (42), the body surrounding a locking pin (45) configured to be slidably engaged with an actuator arm when rotated to a preferred locking position and having an aperture aligned with the locking pin, the aperture having a pin housing (47) to receive the pin. Each locking mechanism also has activation means (49), being an electric solenoid, pneumatic piston, hydraulic ram or cable to allow remote activation of the locking mechanism. The lock body preferably also includes a brace (50) connecting the lock body to the frame bracket to provide additional support to the lock body during use and prevent the body rotating in relation to the frame bracket.

Figure 20:
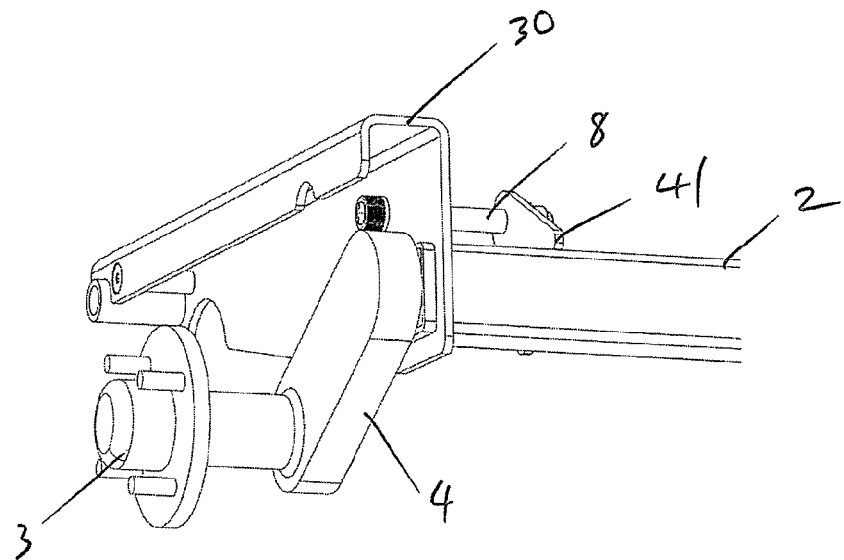
FIG. 20 is a detailed view of part of the embodiment shown in the previous figures.

FIG. 20 is a perspective view of the embodiment shown in FIG. 15, illustrating a preferred embodiment of the actuator arm (30), wherein the arm is formed in a partial box section to increase the stiffness of the component. Preferably, the part is formed from folded sheet metal, machined sections of an extrusion or cut from an RHS steel beam, according to user requirements. It will be appreciated that this construction is also appropriate for the various frame brackets (42), (62), (63).

Figure 21:
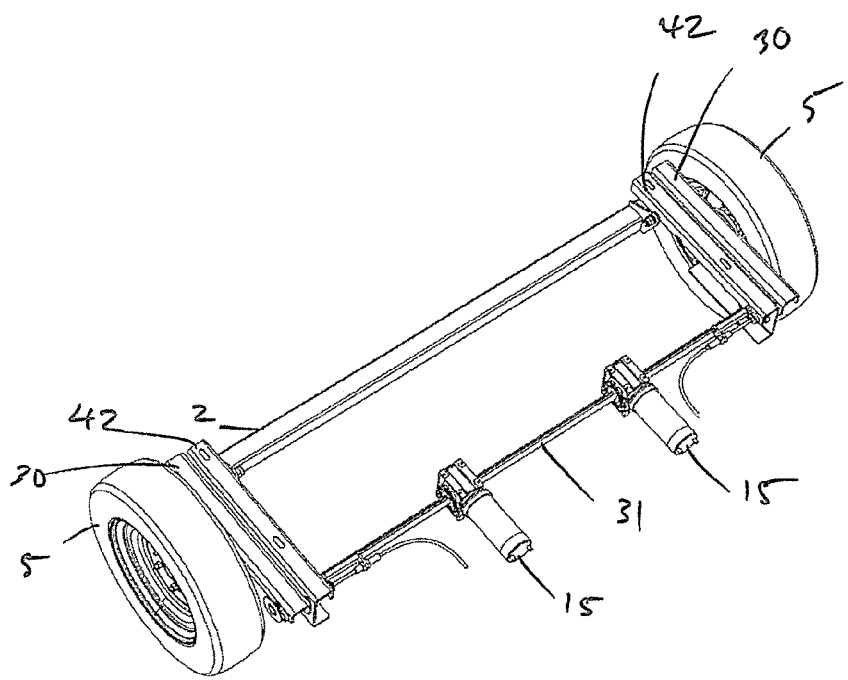
FIG. 21 is a perspective view of a further preferred embodiment of the invention, having two motors connected to a drive shaft.

In FIG. 21 a further preferred embodiment of the invention is shown having a plurality of drive means (15), in this case being two electric motors, connected to a single drive shaft (31) to provide additional lifting force for particularly heavy loads. It will be appreciated that more than two drive units may be connected to a single drive shaft according to user requirements.

Figure 22:
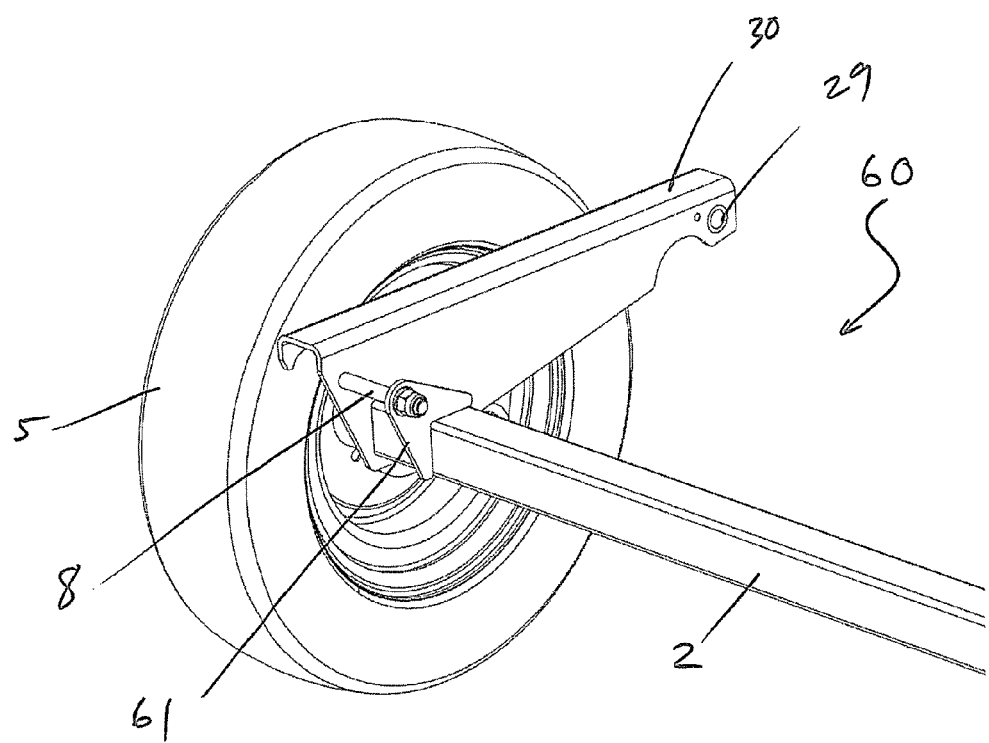
FIG. 22 is a detailed view of a further alternative preferred embodiment of the invention, having an alternative casing bracket configuration.

FIG. 22 shows a detailed perspective view of yet another alternative preferred embodiment of the second configuration (60) of the invention, having an alternative casing bracket (61) connected to the same axle casing (2) and actuator arm (30). The alternative bracket (61) increases the distance between the pivot point (8) and both the wheel axle (3) and retraction mechanism connection point (29).

Figure 23:
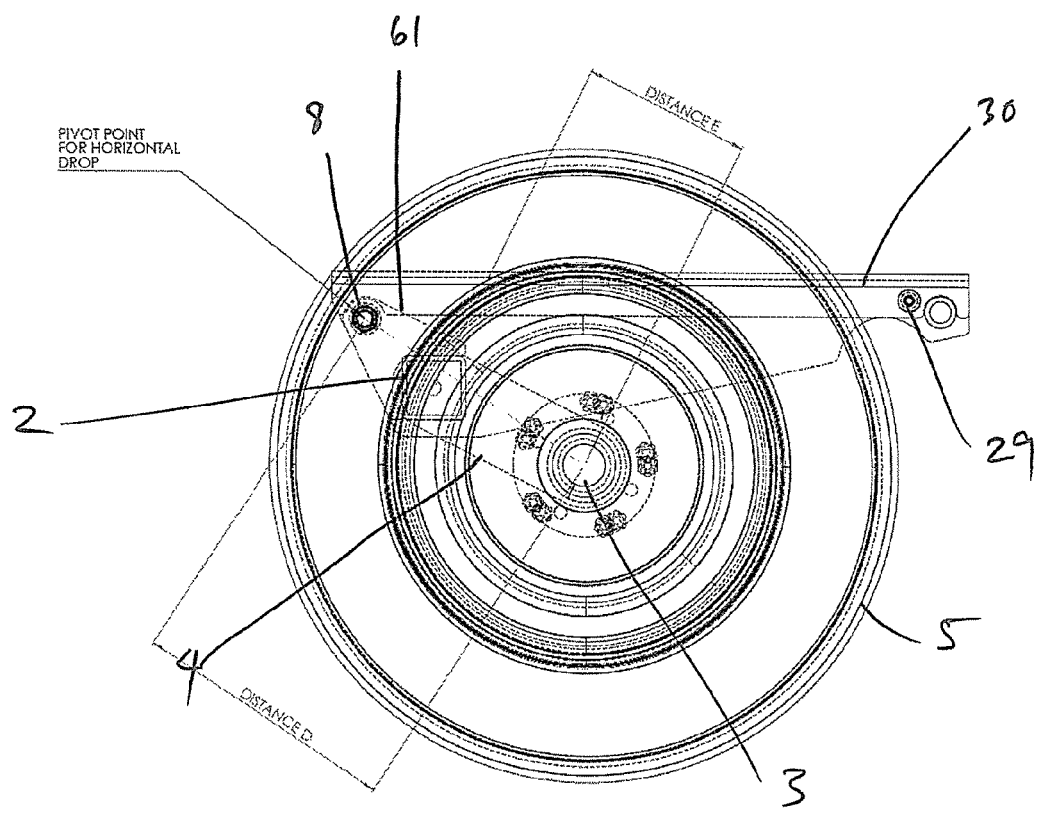
FIG. 23 is a side view of the embodiment shown in the previous figure.

FIG. 23 is a side view of the embodiment shown in FIG. 22, illustrating the alternative position of the pivot point (8) and casing bracket (61) arrangement. Due to the increase in distance between the pivot point and the wheel axle (3), the radius of the arc which the wheel is rotatable along is larger and accordingly, the vertical height which the wheel can be lifted from ground level is greater.

Figure 24A:
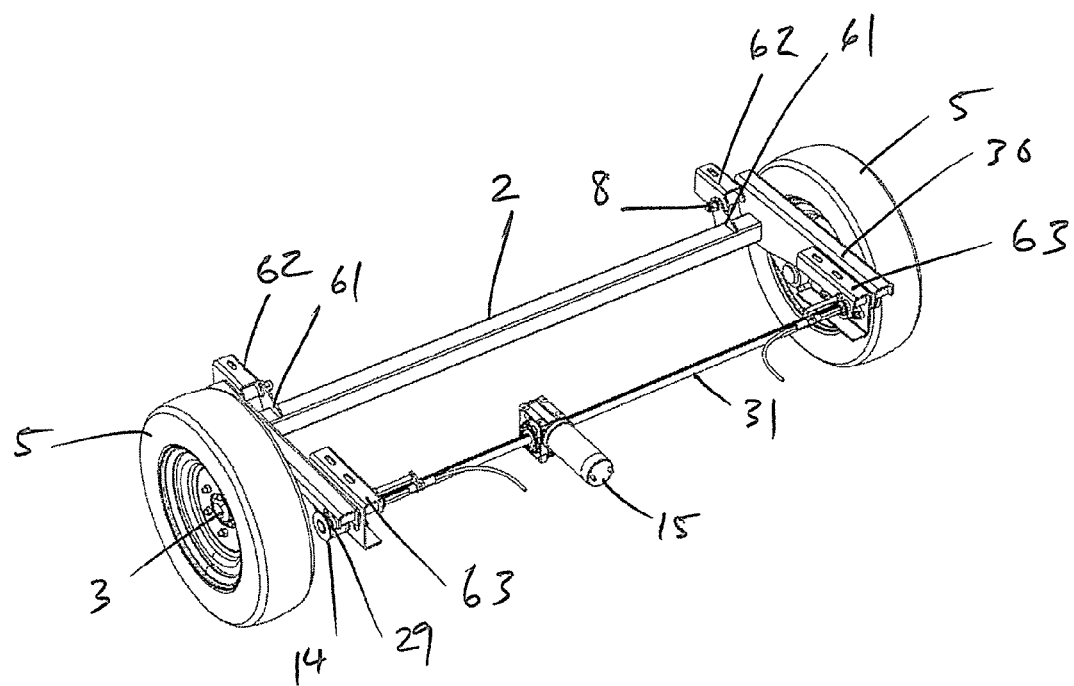
FIGS. 24A-24C are perspective and side view of the embodiment shown in the previous two figures, connected to a pair of wheels and drive means and shown having two actuator arms and associated components rotated between a first preferred position and a second preferred position.
Figure 24B:
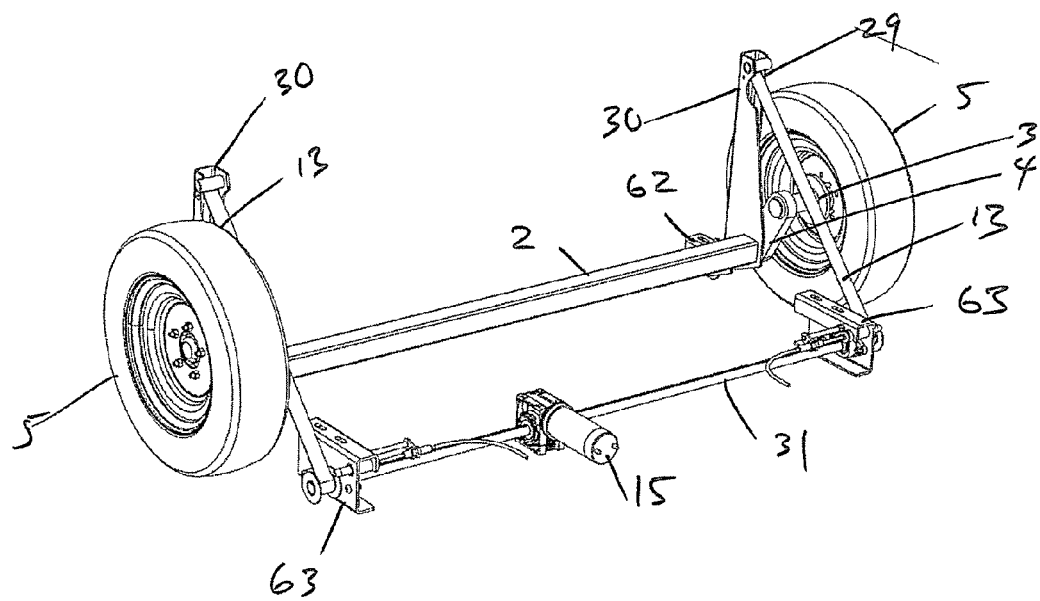
Figure 24C:
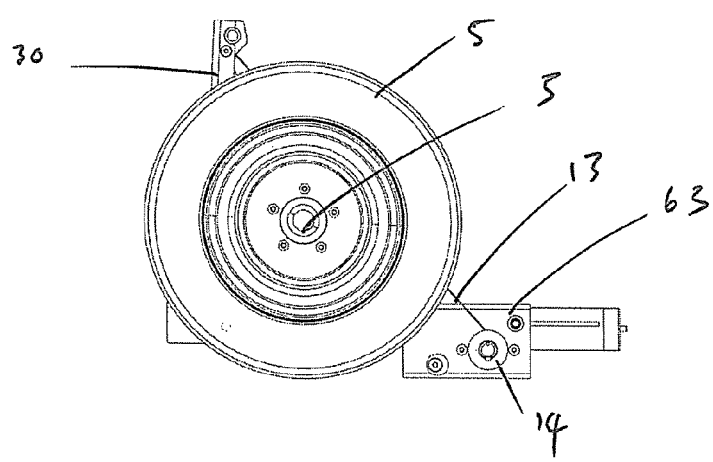

FIGS. 24A-24C show different views of the embodiment shown in FIGS. 22, 23, connected to two alternative frame brackets (62), (63) and the same drive means (15), drive shaft (31), retraction mechanism (13), (14) and lock mechanism (44), (45), (47), (49). Accordingly, it will be appreciated that the modular nature of the invention allows for relatively minor modifications to be made and a substantially identical set of components to be re-used to provide an alternative axle height adjustment assembly with different characteristics.

FIG. 24A shows the second configuration (60) of the invention having a pair of height adjusting assemblies rotated to a preferred minimum axle height position, having an axle casing (2), and associated pair of actuator arms (30), swing arms (4), wheel axles (3) and wheels (5), fixed to at least two casing brackets (61), each bracket rotatably connected to a first frame bracket (62). A drive means (15) is provided, connected along the length of a drive shaft (31), preferably being a keyed or splined shaft and configured to rotate the shaft. The shaft is connected to a pair of second frame brackets (63) and associated drums (13), each drum having a retractable element wound around it and connected to an end of an actuator arm. Each second frame bracket (63) also has a lock mechanism secured to a surface and configured to deploy a locking pin (45) through the bracket and into a pin housing (47) formed on the actuator arm.

FIGS. 24B-24C shows the embodiment shown in FIG. 24A having the height adjusting assemblies rotated to a preferred maximum axle height position, wherein due to the position of the pivot point (8) provided by the casing brackets (61) in relation to the retraction mechanism and second frame brackets (63), the frame brackets are resting on ground level the wheels are either not touching or lightly resting on the ground, not supporting the weight of the assembly or associated trailer. This is particularly useful for applications which require very little ground clearance to assist loading a trailer or vehicle to which the assembly is attached or which would benefit from a loading deck being flat, as opposed to an inclined surface to assist loading.

Figure 25A:
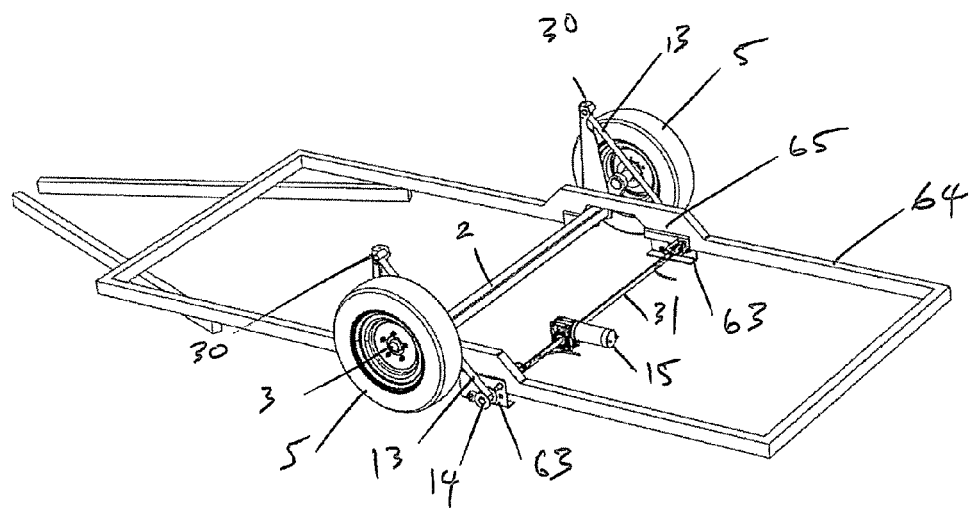
FIGS. 25A-25B are a perspective and side view of the embodiment shown in the previous figures connected to an alternative trailer chassis.
Figure 25B:
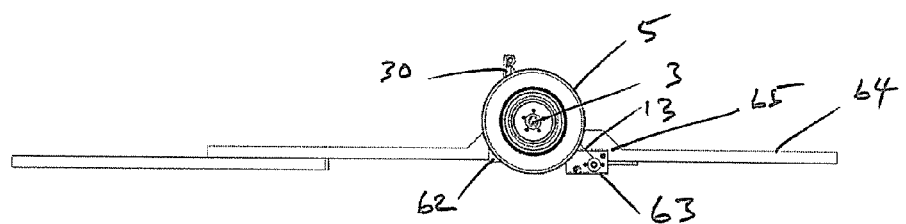

FIGS. 25A-25B illustrate the arrangement shown in FIGS. 24A-24C in relation to a trailer frame, showing the assembly attached to an underside of a customised trailer frame (64). FIG. 25A shows the adapted wheel arch sections (65) which house the frame brackets (62), (63) and which allow the axle casing (2) to be rotated to be substantially level with the pivot point between the casing brackets (61) and the first frame bracket (62), and the trailer frame to rest on ground level.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

It will be apparent to a person skilled in the art that obvious variations or modifications may be made which are in accordance with the spirit of the invention and are considered to be within the scope of the invention.

INDUSTRIAL APPLICABILITY

The invention can be utilised in relation to all wheeled vehicles and in particular, in relation to towed trailers.

The invention claimed is:

1. An assembly for adjusting the distance between an underside of a vehicle and a ground surface, the assembly comprising:
   an axle casing connected substantially parallel to the underside of the vehicle;
   a pair of swing arms, each swing arm being resiliently and rotatably connected at a proximal end to the axle casing;
   a wheel axle connected at a distal end of each swing arm;
   a pair of actuator arms fixed to and extending from the axle casing;
   a retraction mechanism associated with each actuator arm and rotatably connected in a fixed position in relation to the vehicle, the retraction mechanism having at least one retractable linkage connected to the associated actuator arm, the retraction mechanism when rotated adjusts the length of the retractable linkage to rotate the actuator arm, the axle casing attached thereto, and the swing arms with respect to the vehicle; and
   a shaft interconnecting and coupling the retraction mechanisms, thereby synchronizing rotation of the retraction mechanisms.

2. An assembly as defined in claim 1 wherein the axle casing has one or more casing brackets, connected along its length, each easing bracket adapted to rotatably connect the axle casing to the underside of the vehicle around a pivot point the axle casing being offset from a pivot axis defined by the pivot points.

3. An assembly as defined in claim 2, wherein the axle casing houses a torsion bar suspension assembly.

4. An assembly as defined in claim 2, wherein at least one of the actuator arms, at an end proximal to the axle casing, contacts the ground surface when the vehicle is lowered, thereby providing stability.

5. An assembly as defined in claim 2, wherein the distance from the pivot axis to the wheel axles is less than the distance from the axle casing to the wheel axles, thereby providing an improved leverage when applying a rotating force to the retraction mechanisms.

6. An assembly as defined in claim 1, further comprising at least one locking mechanism connected in a fixed position in relation to the vehicle, each locking mechanism having a pin configured deploy from a retracted position to slidably engage with at least one aperture arranged through one of the actuator arms, thereby fixing the actuator arm in a locked position.

7. An assembly as defined in claim 6, wherein the locking mechanism is remotely activated by one or more of the following: an electric solenoid, a cable, a pneumatic piston or a hydraulic ram.

8. An assembly as defined in claim 1, wherein each retraction mechanism includes a drum connected to the retractable linkage.

9. As assembly as defined in claim 8, wherein at least one drum is rotated by a drive means.

10. An assembly as defined in claim 9, wherein the drive means is drivingly coupled to the shaft.

11. An assembly as defined in claim 9, wherein the drive means is selected from one or more of; an electric motor, a hydraulic motor, an internal combustion engine, a manually rotated ratchet mechanism or a worm drive.

12. An assembly as defined in claim 1, wherein the retractable linkage is selected from one or more of: a belt, a chain, a cable or a hydraulic piston.

13. An assembly for adjusting the distance between an underside of a vehicle and a ground surface, the assembly comprising:
- an axle casing connected substantially parallel to the underside of the vehicle;
- a pair of swing arms, each swing arm being resiliently and rotatably connected at a proximal end to the axle casing;
- a wheel axle connected at a distal end of each swing arm;
- an actuator arm fixed to and extending from the axle casing;
- a retraction mechanism associated with each actuator arm and rotatably connected in a fixed position in relation to the vehicle, the retraction mechanism having at least one retractable linkage connected to the associated actuator arm, the retraction mechanism when rotated adjusts the length of the retractable linkage to rotate the actuator arm, the axle casing attached thereto, and the swing arms with respect to the vehicle; and
- a shaft interconnecting the retraction mechanisms;
- wherein the axle casing has one or more casing, brackets connected along its length, each casing bracket adapted to rotatably connect the axle casing to the underside of the vehicle around a pivot point, the axle casing being offset from a pivot axis defined by the pivot points.

14. An assembly for adjusting the distance between an underside of a vehicle and a ground surface, the assembly comprising:
- an axle casing connected substantially parallel to the underside of the vehicle;
- a pair of swing arms, each swing arm being resiliently and rotatably connected at a proximal end to the axle casing;
- a wheel axle connected at a distal end of each swing arm;
- an actuator arm fixed to and extending from the axle casing;
- a retraction mechanism associated with each actuator arm and rotatably connected in a fixed position in relation to the vehicle, the retraction mechanism having at least one retractable linkage connected to the associated actuator arm, the retraction mechanism when rotated adjusts the length of the retractable linkage to rotate the actuator arm, the axle casing attached thereto, and the swing arms with respect to the vehicle;
- a shaft interconnecting the retraction mechanisms; and
- at least one locking mechanism connected in a fixed position in relation to the vehicle, each locking mechanism having a pin configured to deploy from a retracted position to slidably engage with at least one aperture arranged through one of the actuator arms, thereby fixing the actuator arm in a locked position.

* * * * *